US006904024B1

(12) United States Patent
Boch et al.

(10) Patent No.: US 6,904,024 B1
(45) Date of Patent: Jun. 7, 2005

(54) CELLULAR BASE STATION WITH INTEGRATED MULTIPOINT RADIO ACCESS AND INTERCELL LINKING

(75) Inventors: Erik H. Boch, Stittsville (CA); Alan Jaakkola, Kanata (CA)

(73) Assignee: Alcatel Canada Inc., Kanata (CA)

( * ) Notice: Subject to any disclaimer, the term of this patent is extended or adjusted under 35 U.S.C. 154(b) by 29 days.

(21) Appl. No.: 09/174,002

(22) Filed: Oct. 16, 1998

(51) Int. Cl.$^7$ ............................................... H04B 7/00

(52) U.S. Cl. .................... 370/310.1; 370/332; 455/15; 455/562.1

(58) Field of Search ................................. 370/319, 310, 370/321, 326, 330, 331, 337, 346, 344, 345, 347, 395, 401, 338, 328, 335, 350; 375/132; 455/15, 436, 442, 62, 561, 437, 520, 17, 430, 562, 438

(56) References Cited

U.S. PATENT DOCUMENTS

| | | | | |
|---|---|---|---|---|
| 4,535,441 A | * | 8/1985 | Schwaertzel et al. .... | 370/85.15 |
| 4,578,815 A | * | 3/1986 | Persinotti ..................... | 455/62 |
| 4,633,463 A | * | 12/1986 | Mack .......................... | 370/333 |
| 4,727,590 A | * | 2/1988 | Kawano et al. ............. | 455/446 |
| 5,212,830 A | * | 5/1993 | Miller ......................... | 455/447 |
| 5,406,550 A | * | 4/1995 | McTiffin ..................... | 370/337 |
| 5,408,514 A | * | 4/1995 | Sakamoto et al. .......... | 370/332 |
| 5,432,780 A | * | 7/1995 | Smith et al. ................ | 370/338 |
| 5,434,853 A | * | 7/1995 | Hemmady et al. .......... | 370/331 |
| 5,455,821 A | * | 10/1995 | Schaeffer et al. ........... | 370/330 |
| 5,459,727 A | * | 10/1995 | Vannucci .................... | 370/338 |
| 5,519,691 A | * | 5/1996 | Darcie et al. ............... | 370/337 |
| 5,533,027 A | * | 7/1996 | Akerberg et al. ........... | 370/347 |
| 5,537,414 A | * | 7/1996 | Takiyasu et al. ............ | 370/347 |
| 5,581,548 A | * | 12/1996 | Ugland et al. .............. | 370/330 |
| 5,638,371 A | * | 6/1997 | Raychaudhuri et al. ..... | 370/395 |
| 5,640,674 A | * | 6/1997 | Dixon ......................... | 370/337 |
| 5,751,702 A | * | 5/1998 | Evans et al. ................ | 370/337 |
| 5,768,264 A | * | 6/1998 | Anderson et al. ........... | 370/337 |
| 5,771,449 A | * | 6/1998 | Blasing et al. ............. | 455/422.1 |
| 5,790,527 A | * | 8/1998 | Janky et al. ................ | 370/321 |
| 5,809,431 A | * | 9/1998 | Bustamante et al. ..... | 455/562.1 |
| 5,822,309 A | * | 10/1998 | Ayanoglu et al. ........... | 370/315 |
| 5,838,670 A | * | 11/1998 | Billstrom .................... | 370/328 |
| 5,903,826 A | * | 5/1999 | Nowak ..................... | 455/277.1 |
| 5,914,948 A | * | 6/1999 | Frank ......................... | 370/337 |
| 5,936,949 A | * | 8/1999 | Pasternak et al. ........... | 370/328 |
| 6,006,069 A | * | 12/1999 | Langston ..................... | 455/62 |
| 6,009,096 A | * | 12/1999 | Jaisingh et al. ............. | 370/395 |
| 6,016,311 A | * | 1/2000 | Gilbert et al. .............. | 455/562 |
| 6,031,830 A | * | 2/2000 | Cowan ........................ | 370/338 |
| 6,049,593 A | * | 4/2000 | Acampora ................... | 370/338 |
| 6,061,339 A | * | 5/2000 | Nieczyporowicz et al. . | 455/562 |
| 6,151,312 A | * | 11/2000 | Evans et al. ................ | 370/338 |

(Continued)

FOREIGN PATENT DOCUMENTS

WO    WO98/47302 A2 * 12/1998 ............ H04Q/7/38

OTHER PUBLICATIONS

P. Vary, Implementation Aspects of the Pan–European Digital Mobile Radio System, 1989, IEEE, pp. 4–17 to 4–22.*

Primary Examiner—Duc Ho
Assistant Examiner—Phuongchau Ba Nguyen
(74) Attorney, Agent, or Firm—Marks & Clerk

(57) ABSTRACT

A scaleable, broadband wireless system for providing radio access to a metropolitan area. The metropolitan area is sub-divided into overlapping cellular areas each having a base station for communication with network interface units at customer sites within each cell. ATM Radio Interface Cards (ARICs), both time division multiple access (TDMA) and frequency division multiple access (FDMA), in each base station implement protocols for bi-directionally linking the NIUs with the ATM backbone. FDMA ARICs provide point to point radio access between base stations over intercell links. The capacity of the system can be scaled by adding the appropriate ARICs as required to meet demand.

18 Claims, 6 Drawing Sheets

U.S. PATENT DOCUMENTS 6,151,513 A * 11/2000 Petry et al. .............. 455/562.1
6,198,929 B1 * 3/2001 Krishnamurthi et al. .... 455/442
6,278,697 B1 * 8/2001 Brody et al. ................ 370/310
6,381,230 B1 * 4/2002 Wheatley et al. ........... 370/331

* cited by examiner

CELLULAR BASE STATION WITH INTEGRATED MULTIPOINT RADIO ACCESS AND INTERCELL LINKING

FIELD OF THE INVENTION

This invention relates to a cellular, broadband wireless system for use in providing radio access to a large geographic area and more particularly to a radio interface system at a cellular, multipoint base station that can provide scalable, broadband radio access to multiple customer sites and simultaneously provide scalable point to point radio interconnect between cells.

BACKGROUND

Broadband wireless systems, such as Local Multipoint Delivery/Communication Systems (LMDS/LMCS), represent an effective implementation whereby small and medium sized businesses are able to connect to the ATM backbone without the need for dedicated terrestrial cabling. A LMCS/LMDS typically has a base station connected to the ATM backbone, the base station having a transceiver for point to multipoint communication with network interface units (NIUs) located at customer sites, usually fixed, within a cellular area.

Typically, a base station is located centrally within a substantially circular cellular area. To make better use of the range of radio frequencies which may be licensed to a service provider, and to provide greater coverage, a cell is frequently divided into sectors (for example four sectors each covering 90 degrees) with a sectored antenna operating in each sector.

Network interface units (NIUs) are located at customer sites within each sector and have means for receiving transmission from the base station by way of a point to multipoint protocol. The NIUs connect to customer premise equipment (CPE) via T1 or Ethernet links, for example. Additionally, each NIU will have a highly directional antenna pointed at the base station for bi-directional communication therewith by way of a point to point protocol.

A large metropolitan area will typically be covered by a number of adjacent (overlapping to some degree) cells each having a base station for communicating with customer sites within each cell. Generally, cellular radio access systems used for fixed, bi-directional radio access are interconnected to form a network using radio-based intercell linking or other suitable alternatives such as fiber optics or copper wire. In this way the coverage provided to the metropolitan area can be coordinated.

Traditionally, the multipoint radio access system and the radio intercell links (so called point-to-point radios) were essentially two separate systems. In a radio based intercell link implementation a service provider typically obtains a license for a fixed frequency or frequency spectrum and then uses transmission equipment tuned to a licensed frequency. Therefore, the point-to-point radios for intercell linking are fixed bandwidth units and do not significantly scale in their capacity.

SUMMARY OF THE INVENTION

The subject of this invention is the architecture of a cellular, multipoint base station which can provide scaleable, broadband radio access to fixed customer sites and simultaneously provide scaleable point-to-point radio interconnect between the cells, thereby forming a cellular-type network with ubiquitous coverage of a predetermined service area, nominally requiring more than one cell.

Therefore, in accordance with a first aspect of the present invention there is provided in a cellular, broadband wireless digital network an interface system at a base station for providing bi-directional, point to multipoint access to network interface units at customer sites within a cellular area and point to point bi-directional radio access to a base station unit in an adjacent cellular area.

In a preferred embodiment a large geographic area is covered by a plurality of overlapping cells each having a base station for communicating with fixed customer sites within each cell. A designated base station is controlled by a network manager (which normally also manages many other network components) and is in bi-directional communication with the other base stations by way of radio based intercell links. ATM Radio Interface Cards (ARICs) at the base stations are used to provide point to multipoint communication with NIUs and point to point radio communication using intercell links between base stations. The capacity of the system both with respect to customer sites and intercell links is scaleable by increasing or decreasing the number of ARICs.

In accordance with a second aspect of the invention there is provided a method of providing scaleable, broadband wireless access to a large geographic area comprising: dividing the geographic area into cellular areas; providing a base station within each cellular area; and providing at least two ATM Radio Interface Cards (ARICs) at each base station, one of the ARICs for communicating with Network Interface Units (NIUs) within the cellular area and another one of the ARICs for providing radio access to ARICs in other base stations.

BRIEF DESCRIPTION OF THE DRAWINGS

The invention will now be described in greater detail with reference to the accompanying drawings wherein.

DETAILED DESCRIPTION OF THE INVENTION

Figure 1:
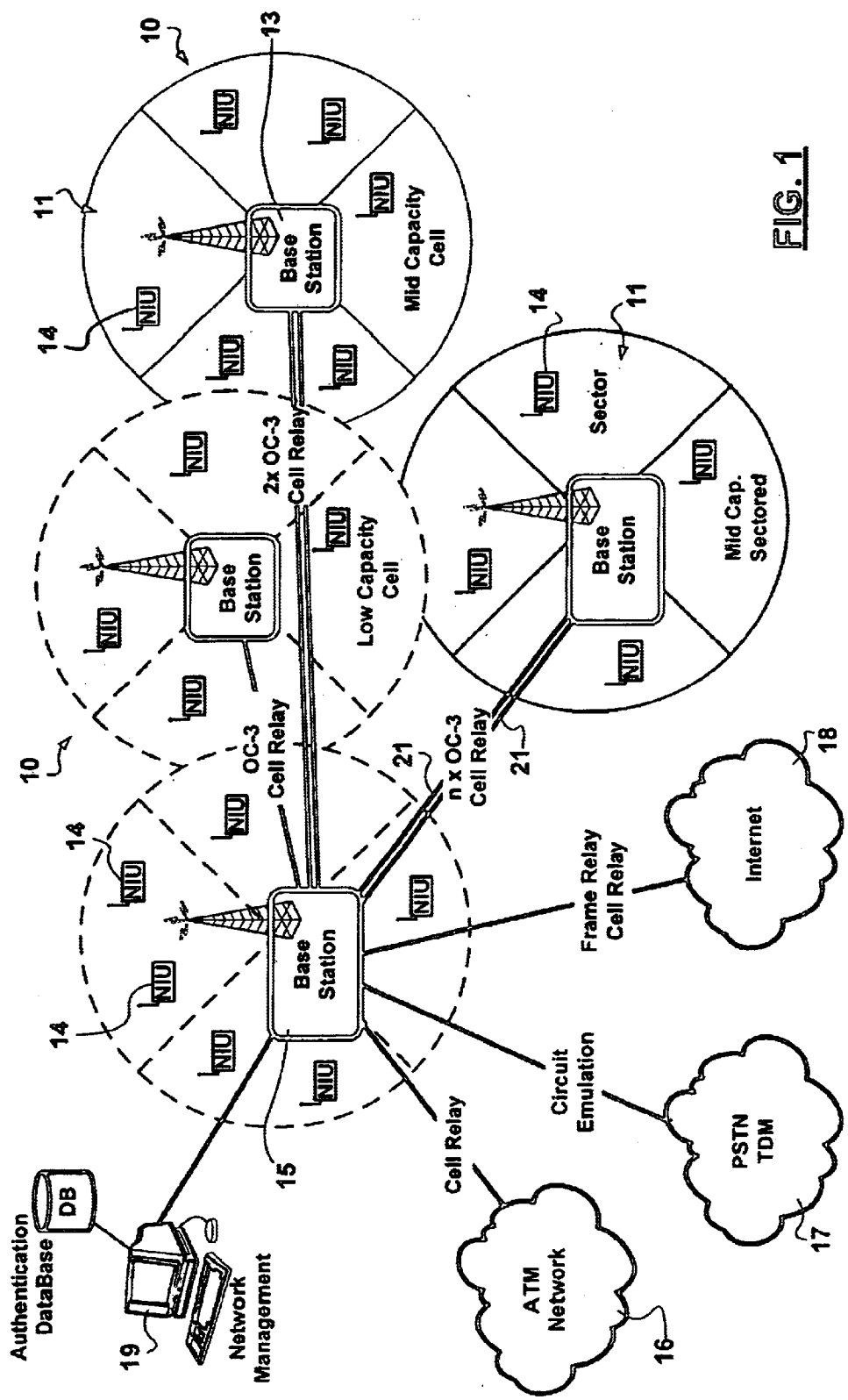
FIG. 1 is a high level diagram of an ATM wireless system having a network manager and linked base stations in respective cells.

FIG. 1 illustrates, at a high level, a broadband, ATM-based wireless system. As shown in this implementation, an array of overlapping cells 10 provide coverage to a metropolitan area. Each cell 10 is subdivided into sectors 11 with a central base station 13. Network Interface Units 14 at customer sites have transceivers for communicating with the base station over wireless links. As shown in FIG. 1 one of the base stations 15 is connected to the ATM network 16 and may also be connected to other networks such as the Public Switched Telephone Network 17 or Internet 18. Additionally, one of the base stations such as base station 15 is connected to a network manager 19 for the purpose of coordinating services to the cell array. In the implementation of FIG. 1 base station 15 is connected to each of the other base stations 13 via intercell links 21, which may be, for example, optical fiber or, according to the present invention, radio links.

Typically, communication between each base station 13 and associated NIUs 14 within each sector utilizes a point-to-multipoint protocol while communication from each NIU 14 to the cellular base station is by point-to point protocol. Customer premise equipment (not shown) at customer sites are linked to the NIUs and provide access to the ATM network 16.

Figure 2:
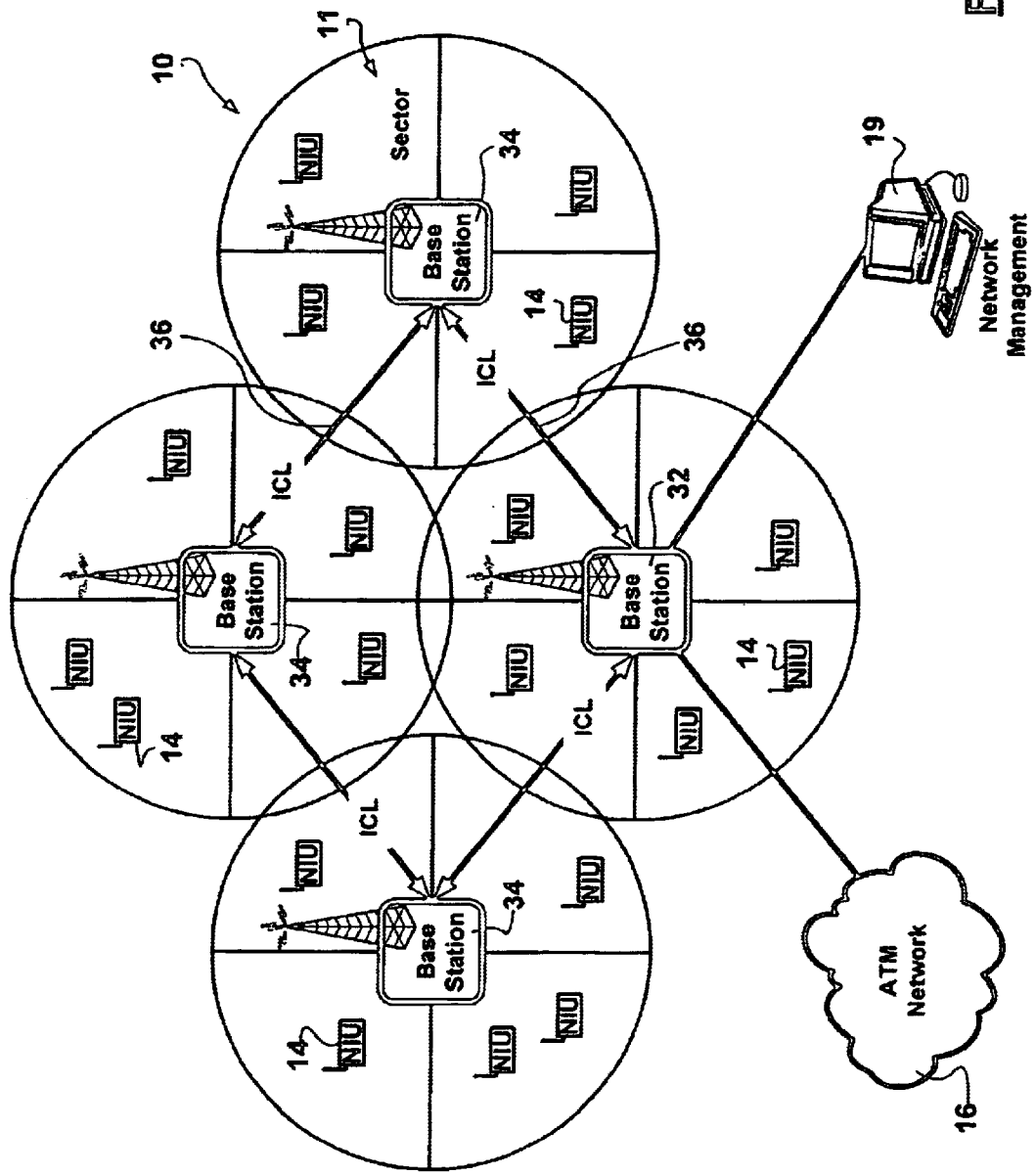
FIG. 2 illustrates a cell array having ringed, bi-directional intercell radio links

The intercell links for bi-directional radio communication, according to the present invention, can be implemented, for example, in a ringed or meshed configuration. An example of a ringed configuration is shown in FIG. 2 wherein one of the base stations 32 is connected to the ATM network 16 and the network manager 19. Each of the other base stations 34 is in bi-directional communication with base station 32 over intercell radio links 36.

Figure 3:
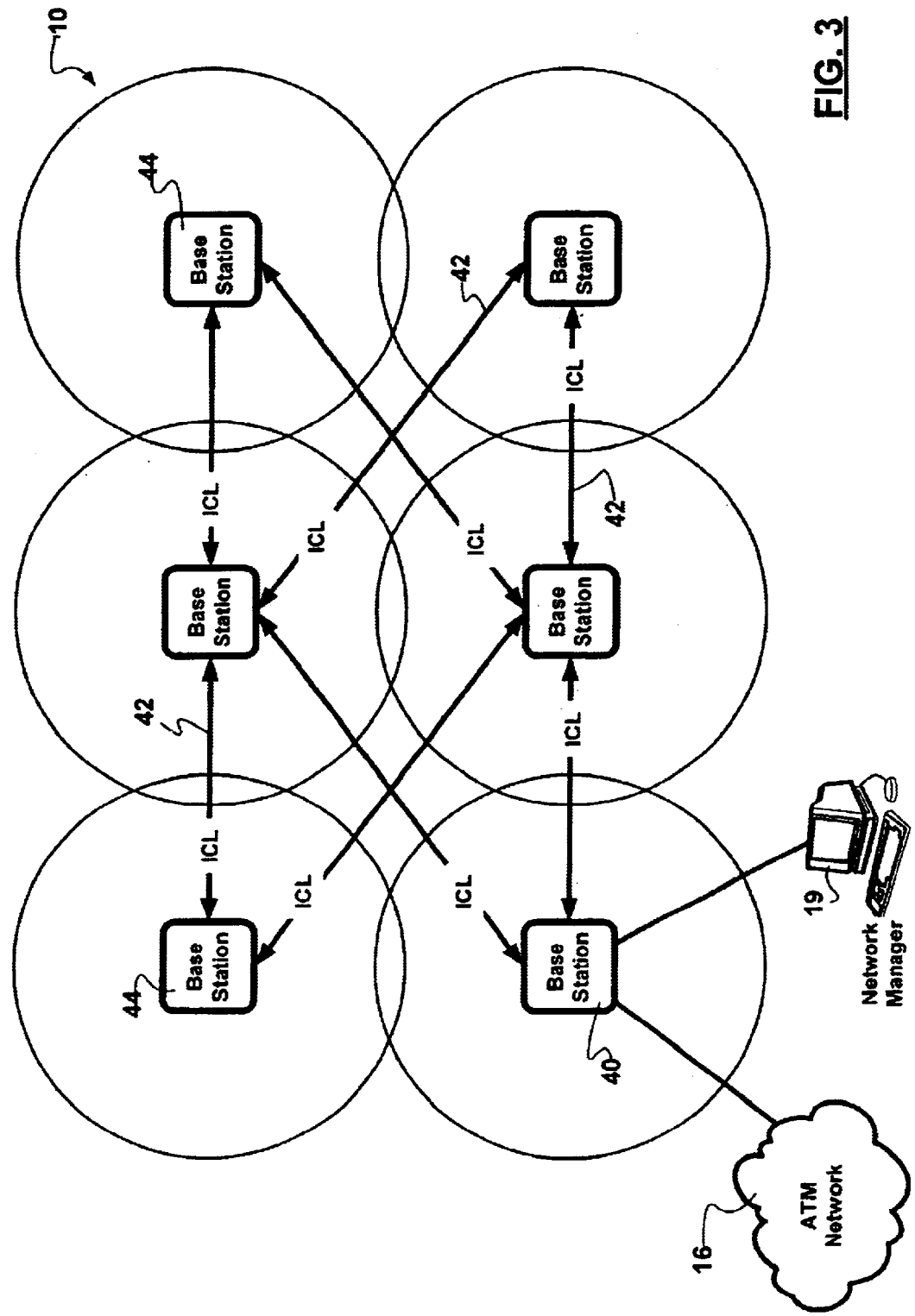
FIG. 3 illustrates a cell array having meshed, bi-directional intercell radio links.

An example of a meshed configuration is illustrated in FIG. 3. In this example base station 40 is connected to the ATM network 16 and to the network manager 19. Bi-directional communication between the remaining base stations 44 is conducted via links 42. In this example and in the example of FIG. 2 it is to be understood that any of the base stations can be configured to have direct access to the ATM network and/or the network manager.

The base station architecture is based on Asynchronous Transfer Mode (ATM) functionality which houses circuit card assemblies, known herein as ATM Radio Interface Cards (ARICs) 23, which provide connectivity to customer sites, usually fixed, within the coverage area. In a preferred embodiment of the invention the ARICs 23 are installed in an ATM multi-services switch at the base station. An example of a multi-services switch is a Newbridge 36170.

The ARICs 23, as will be discussed later, provide service to both the multipoint radio access system and the radio intercell links. In a particular implementation of the multi-point radio aspect of the invention a time division multiple access (TDMA) ARIC provides downlink point to multi-point communication while frequency division multiple access (FDMA) ARICs provide the uplink, point to point access. According to the present invention FDMA ARICs are also used for the intercell radio links. Reference may be made to Applicant's co-pending Canadian patent application filed Jul. 9, 1998 and entitled Radio Interface Card for a Broadband ATM System for greater detail respecting the ARIC The contents of the aforementioned Canadian application are incorporated herein by reference.

Figure 4:
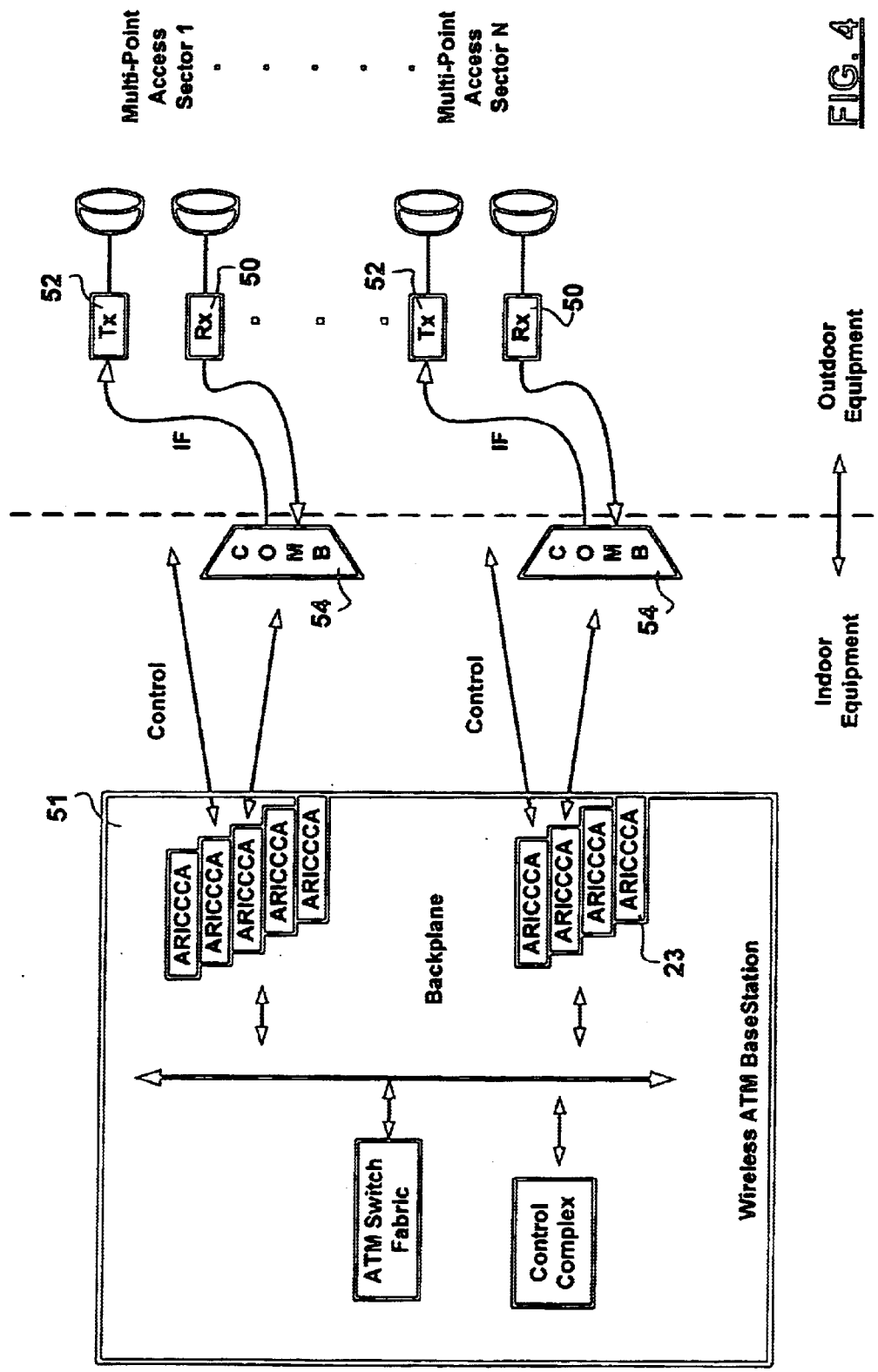
FIG. 4 illustrates the architecture of an ATM based Multipoint base station used to provide fixed, broadband wireless access.
Figure 5:
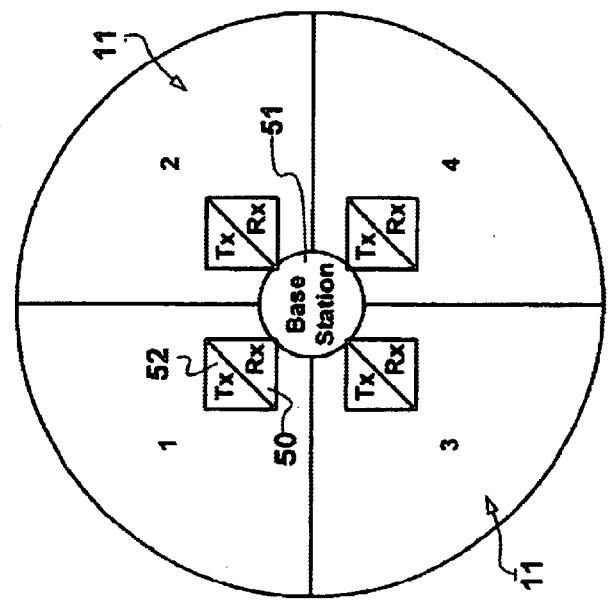
FIG. 5 shows a typical four sectored cell structure used to create a circular cell coverage area.

FIG. 4 shows the system architecture according to the present invention. Essentially the ARIC card circuitry in the base station 51 provides the interface between the multipoint radio access functionality operating within the sector(s). As shown in FIG. 4 the ARIC cards 23 are connected to outside receivers/transmitters 50, 52 by way of combiners 54. Typically 4 sectors 11 would be implemented to provide a circular (i.e. 360 degrees) cell as shown in FIG. 5. In a metropolitan application where the total coverage area is greater than the area covered by a single cell (a cell may have a 2–3 km radius, for example) multiple cells are overlapped to provide a larger coverage area as shown in FIG. 6.

Figure 6:
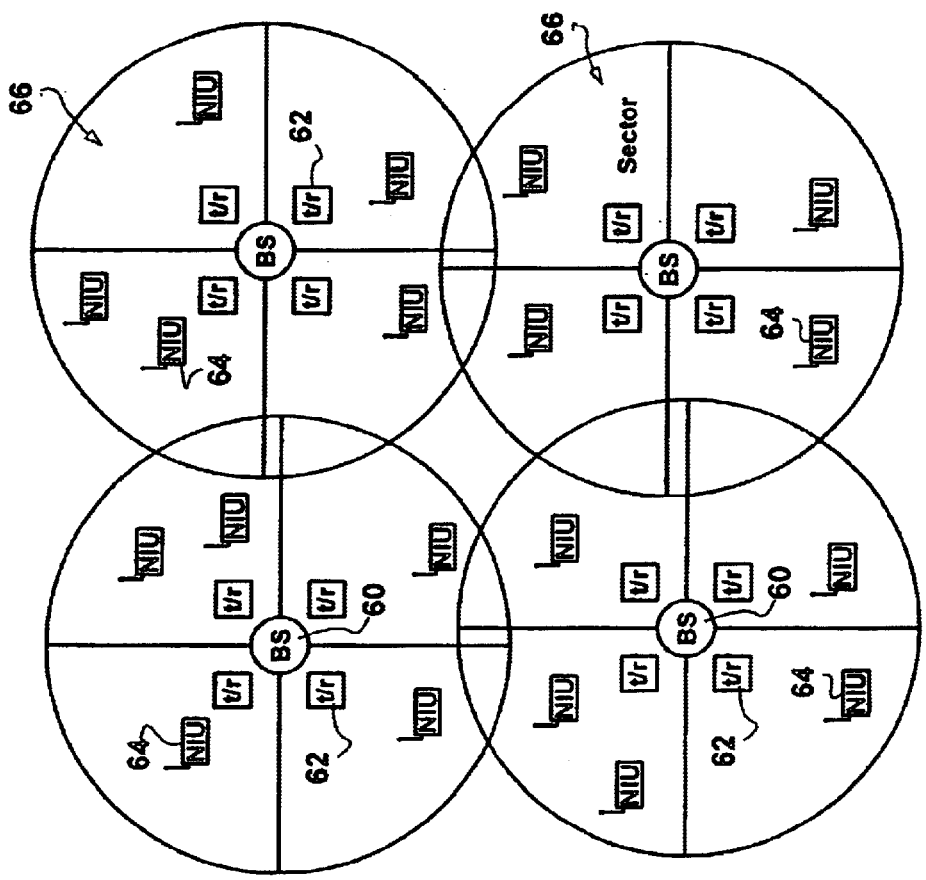
FIG. 6 illustrates overlapped cells used to provide coverage to a selected service area such as a metropolitan area.

As shown in FIG. 6 each cell, according to this embodiment of the invention, has a base station 60 operating a sectored antenna 62 for communicating with NIUs 64 within respective sectors 66. As demand for service within each sector (and/or cell) increases ARIC cards are added to respective base stations to increase the capacity of each base station in a quasi-linear fashion. Typically, the amount of digital data which is switched out of the base station and sent to other parts of the network, for example the backbone or Wide Area Network (WAN), also increases with increasing capacity in the multipoint access layer of the network. As a result of this capacity relationship it is highly desirable to implement a scaleable capacity solution for both the Multi-Point Access layer as well as the WAN layer of the system. It is further desirable to implement both the Multi-Point base station and radio based intercell Links (so called ICLs) from a single base station entity which can be remotely managed by a network manager 19 (Newbridge 46020, for example) in an integrated fashion. The network manager 19, in an exemplary embodiment, configures the operating frequencies, establishes the modulation rate, is responsible for the desired forward error correction (FEC) values and sets transmission power levels.

Figure 7:
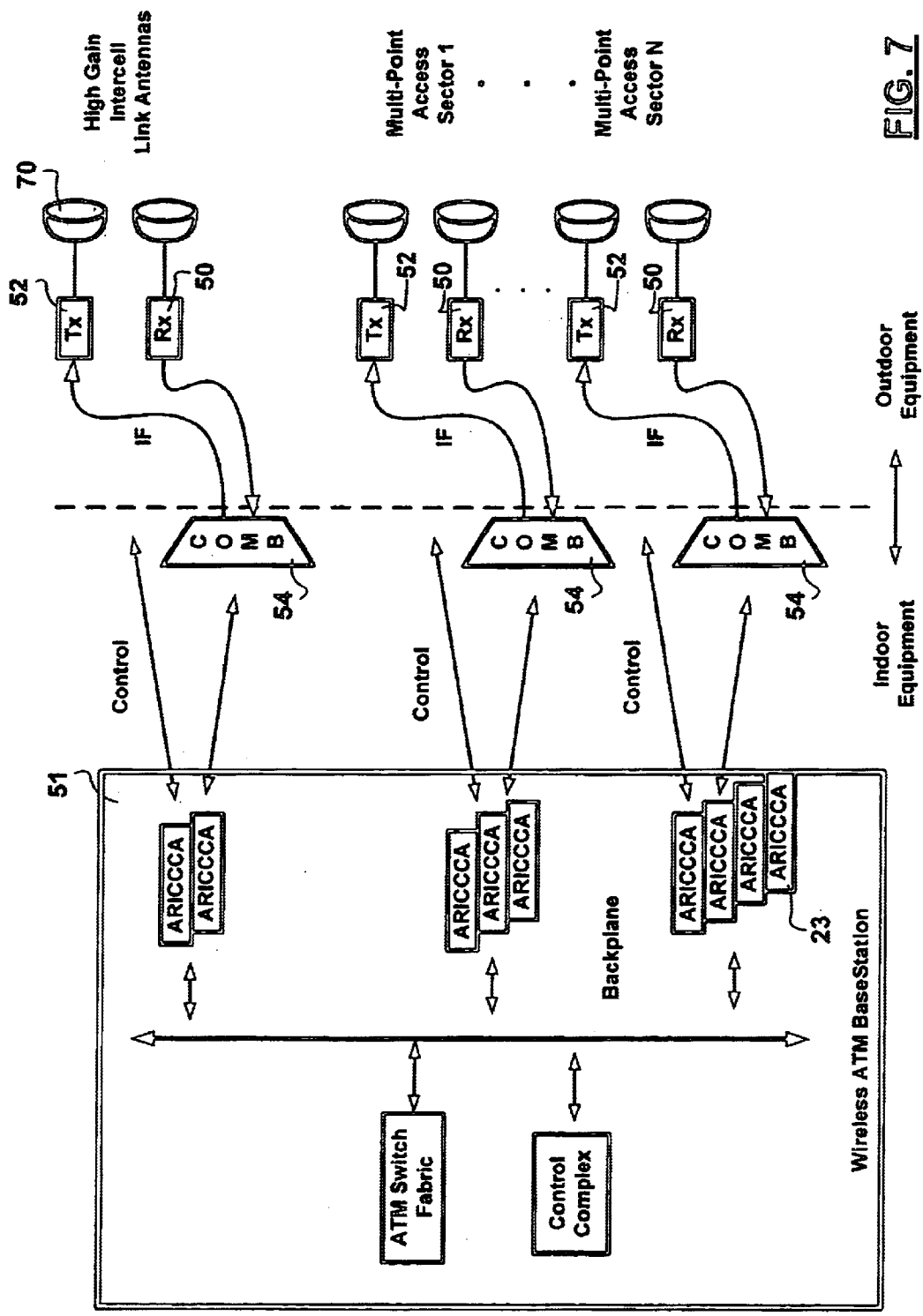
FIG. 7 shows the architecture of an ATM based wireless access base station able to provide scaleable, integrated multipoint access and intercell link functionality.

FIG. 7 shows the architecture of a base station 51 for implementing the aforementioned integrated system. In this architecture the TDMA/FDMA ARIC cards 23 are used, along with ATM signal switching/routing, to achieve a wireless base station with an integrated ability to provide multi-point access to fixed customer sites as well as providing FDMA ARICs for the ICL functionality. In both cases the architecture is scalable through adding the appropriate ARIC modules. This integrated and scalable solution results in a high degree of performance and cost effectiveness, since capacity is added only as required. As shown in FIG. 7 the ARIC cards 23, combiner 54 and transceivers 50, 52 previously shown in FIG. 4 in relation to an ATM-based wireless base station are the same. One or more additional FDMA ARICs are incorporated in the system shown in FIG. 7 to provide access to the intercell radio link. The ICL ARIC(s) are connected to high gain (for example 36 to 42 dB) intercell link antennas 70 via the combiner 24. In addition to the high gain, (36 to 42 dB compared to 21 db for sectored antennas, for example) the intercell link antennas provide improved directionality.

In an embodiment of the invention the carrying capacity of the intercell link is 155 mb/s, i.e. OC-3 capability. The intercell link carries aggregate traffic between base stations including control traffic and user data traffic. In accordance with the invention a selected or designated base station is in bi-directional communication with base station(s) in one or more adjacent cellular areas. Also, as indicated previously, one of the base stations is remotely managed by a network manager to provide coordinated services throughout the large geographic area. Each of the base stations in adjacent cells, however, has a communication link to the network manager via the designated or selected base station.

Although a particular embodiment of the invention has been illustrated and described it will be apparent to one skilled in the art that numerous variations and alterations can be implemented without departing from the basic concept. It is to be understood, however, that such variations and alterations will fall within the scope of the invention as defined by the appended claims.

What is claimed is:

1. An interface system at a base station in a cell within a cellular wireless network for providing bi-directional wireless communications to Network Interface Units (NIUs) at customer sites within the cell, said base station having a highly directional antenna for providing a point to point inter-cell radio link for communicating with a base station in a neighboring cell, the interface system further comprising a multi-services switch equipped with one or more first radio interface cards for providing wireless communications between the base station and the NIUs via said highly directional antenna and one or more second radio interface cards for providing the point to point inter-cell radio link.

2. An interface system as defined in claim 1 wherein said cellular wireless network has a plurality of cells, each having a base station for providing wireless communications to NIUs within each cell and for providing a point to point inter-cell radio link with other base stations within the network.

3. An interface system as defined in claim 2 wherein one of the base stations is controlled by a network manager to provide configuration parameters for each of said one or more first and said one or more second interface cards in each of the multi-services switch in each base station.

4. An interface system as defined in claim 3 wherein the cellular wireless network is connected to an asynchronous transfer mode (ATM) network.

5. An interface system as defined in claim 2 wherein said inter-cell radio link between respective base stations is in a ring configuration, wherein one of the base stations is connected to a network and a network manager, and each of said other base stations is in bidirectional communication with said one base station over inter-cell radio links.

6. An interface system as defined in claim 2 wherein said inter-cell radio link between respective base stations is in a mesh configuration.

7. An interface system as defined in claim 1 wherein each cell is sub-divided into sectors and each base station has a sectored antenna for communicating with NIUs located in each sector within the cell.

8. An interface system as defined in claim 7 wherein each of said one or more interface cards and each of said one or more second interface cards communicates with said sectored antenna via one or more combiners.

9. A base station in a cell of a cellular, wireless communications network for providing wireless, bi-directional communication with network interface units (NIUS) within the cell, the base station further having a highly directional antenna for providing a point to point inter-cell radio link with a base station in a neighboring cell, and a multi-services switch equipped with a first radio interface card for providing the wireless, bi-directional communication between the base station and the NIUs and a second interface card for providing the point to point radio inter-cell link, said radio interface cards being, selectively, one of the following: frequency division multiple access (FDMA) or time division multiple access (TDMA).

10. A base station as defined in claim 9, wherein said cell is sub-divided into multiple sectors and said multi-services switch is equipped with a first radio interface card for each sector.

11. A base station as defined in claim 10 connected to an Asynchronous Transfer Mode backbone for providing broadband wireless service to said NIUs.

12. A base station as defined in claim 10 connected to a network manager for receiving configuration parameters respecting said first and second radio interface cards.

13. A base station as defined in claim 12 wherein said configuration parameters include; operating frequencies, modulation rates, forward error correction values, and transmission power levels.

14. A base station as defined in claim 10 wherein said second interface card is equipped to provide point to point, bi-directional radio communication with base stations in neighboring cells over said radio inter-cell link.

15. A base station as defined in claim 14 wherein said radio inter-cell link is in a ring configuration.

16. A base station as defined in claim 14, wherein said radio, intercell link is in a mesh configuration.

17. A method of providing communications between base stations in a cellular, wireless network having multiple cells, each of the multiple cells having a base station, the method comprising: providing a multi-services switch at each of the base stations, each switch being equipped with a radio interface card for providing point to point bi-directional communication with other base stations in the network; providing a network manager in association with at least one of the base stations for configuring the radio interface cards, and providing a directional antenna for each multi-services switch to support point to point bi-directional communication between base stations over a radio inter-cell link, wherein each of said cells in sub-divided into multiple sectors and said multi-services switch is equipped with second radio interface cards for each sector, said second radio interface cards for wireless, bi-directional communication with network interface units (NIUs) within each sector.

18. The method as defined in claim 17 wherein said network manager configures said radio interface cards with respect to operating frequencies, modulation rates, forward error correction values, and transmission power levels.

* * * * *